(12) United States Patent
Chashiro

(10) Patent No.: US 8,764,121 B2
(45) Date of Patent: Jul. 1, 2014

(54) AUTOMOBILE WHEEL

(75) Inventor: Katsuya Chashiro, Aichi (JP)

(73) Assignee: Central Motor Wheel Co., Ltd., Aichi (JP)

( * ) Notice: Subject to any disclaimer, the term of this patent is extended or adjusted under 35 U.S.C. 154(b) by 644 days.

(21) Appl. No.: 13/026,516

(22) Filed: Feb. 14, 2011

(65) Prior Publication Data

US 2011/0198916 A1    Aug. 18, 2011

(30) Foreign Application Priority Data

Feb. 18, 2010    (JP) ................................. 2010-033096

(51) Int. Cl.
  *B60B 3/04*    (2006.01)
(52) U.S. Cl.
  USPC .................................................... 301/95.105
(58) Field of Classification Search
  USPC ............... 301/105, 101, 103, 106, 104, 107, 301/95.105, 95.107, 95.11, 63.105; 29/894.322, 894.323
  See application file for complete search history.

(56) References Cited

U.S. PATENT DOCUMENTS

| | | | | |
|---|---|---|---|---|
| 5,591,386 A | * | 1/1997 | Jansen et al. | 264/46.9 |
| 5,899,537 A | * | 5/1999 | Abe et al. | 301/63.101 |
| 6,447,071 B1 | * | 9/2002 | Griffin | 301/63.104 |
| 7,347,505 B2 | * | 3/2008 | Rodrigues et al. | 301/63.103 |
| 2006/0284474 A1 | * | 12/2006 | Bluemel | 301/63.101 |
| 2009/0212620 A1 | * | 8/2009 | Coleman et al. | 301/63.104 |
| 2010/0181822 A1 | * | 7/2010 | Nakamura et al. | 301/63.105 |

FOREIGN PATENT DOCUMENTS

JP    11-42901 A    2/1999

* cited by examiner

*Primary Examiner* — Glenn Dayoan
*Assistant Examiner* — Pinel Romain
(74) *Attorney, Agent, or Firm* — McDermott Will & Emery LLP

(57) ABSTRACT

A front flange portion formed at an outer peripheral edge portion of a wheel disc includes an annular front peripheral portion provided on a design surface side and an annular back peripheral portion folded backward from the annular front peripheral portion to extend radially inwardly and in surface contact with a back surface of the annular front peripheral portion, and the annular front peripheral portion and the annular back peripheral portion are integrally inclined to the surface side. Therefore, the front flange portion can mitigate stress concentration on the front flange portion due to a load generated while the automobile is running. In addition, the front flange portion has, because of its shape, high durability against a radially inward load generated by a contact with a curbstone or the like.

5 Claims, 8 Drawing Sheets

FIG.3
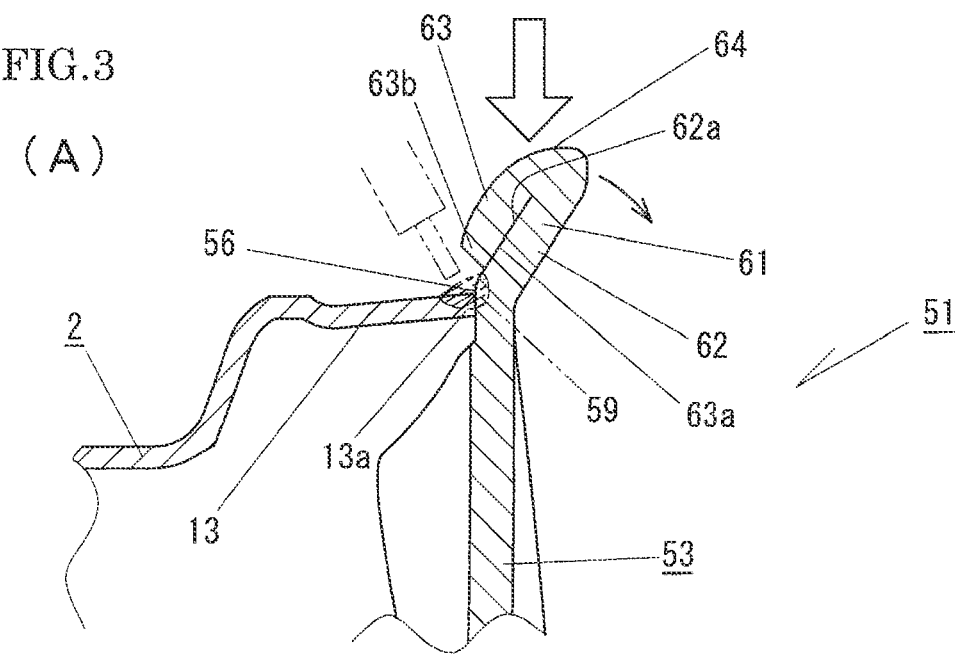
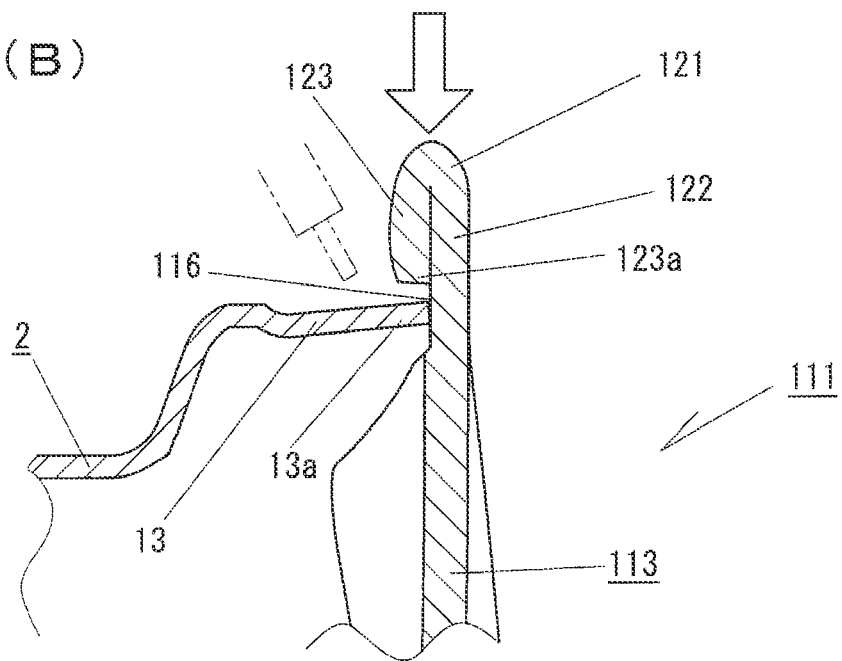

AUTOMOBILE WHEEL

CROSS-REFERENCE TO PRIOR APPLICATIONS

Priority is claimed to Japanese Patent Application No. 2010-033096, filed on Feb. 18, 2010, which is hereby incorporated by reference in its entirety herein.

FIELD OF THE INVENTION

The present invention relates to an automotive wheel in which a wheel rim on which a tire is to be mounted and a wheel disc to which an axle is to be coupled are welded to each other for integration.

BACKGROUND

There are so-called two-piece automotive wheels in which a generally cylindrical wheel rim and a generally disc-like wheel disc are welded to each other. As such two-piece automotive wheels, there are known full-face automotive wheels in which a front flange portion is formed at an outer peripheral edge portion of the wheel disc.

An example of the full-face automotive wheels is proposed in No. JP-A-Hei 11-042901 ("JP '901"), for example. As shown in FIG. 8, a wheel rim "f" includes a front bead seat portion "g" provided at one opening edge portion and a back flange portion "j" provided at the other opening edge portion. A wheel disc "p" includes a front flange portion "r" provided at an outer peripheral edge portion and folded backward in a curved shape. An opening end portion "h" of the front bead seat portion "g" of the wheel rim "f" and an inner peripheral end portion "v" of the front flange portion "r" of the wheel disc "p" are welded to each other over the entire circumference of the wheel to form a full-face automotive wheel "m". The thus configured full-face automotive wheel "m" can secure a large design surface on the wheel disc "p", advantageously providing high design quality.

In the configuration disclosed in JP '901 described above, the opening end portion "h" of the front bead seat portion "g" of the wheel rim "f" and the inner peripheral end portion "v" of the front flange portion "r" of the wheel disc "p" are welded to each other so that a welded portion "i" joins the wheel rim "f" and the wheel disc "p" to each other. When an automobile equipped with the automotive wheel "m" is running, a load acts on the wheel rim "f" via a tire, and a load acts on the wheel disc "p" via an axle. The front flange portion "r" of the automotive wheel "m" is folded backward in a curved shape and has a generally U-shaped cross-section. Due to the shape of the front flange portion "r" described above, the front flange portion "r" tends to be repeatedly elastically deformed by the load acting on the wheel rim "f" and the load acting on the wheel disc "p", and tends to be subjected to a stress concentration. Further, because the front flange portion "r" is folded backward through a pressing process or the like, a residual stress may be caused at a curved outermost peripheral edge portion of the front flange portion "r". The durability of the front flange portion "r" is limited by the residual stress and the stress concentration due to the loads described above.

In addition, a proposal is made for forming a plurality of drain holes "k" through the front flange portion "r" described above in the configuration disclosed JP '901. The drain holes "k" are provided in order to drain rainwater and so on accumulated in the inner space of the front flange portion "r" because rainwater and so on tend to be accumulated therein while the automobile is running. When the drain holes "k" are provided as described above, there is a possibility that the durability limit of the front flange portion "r" is further reduced when the front flange portion "r" is repeatedly deformed.

SUMMARY OF THE INVENTION

The present invention proposes an automotive wheel that includes a wheel disc provided with a front flange portion folded backward and having improved durability.

The present invention provides an automotive wheel including a wheel rim in which a back flange portion is formed at one opening edge portion and a front bead seat portion is formed at the other opening edge portion, and a wheel disc in which a front flange portion is formed at an outer peripheral edge portion, in which the front flange portion of the wheel disc includes an annular front peripheral portion provided on a design surface side and an annular back peripheral portion folded backward from the annular front peripheral portion to extend radially inwardly and in surface contact with a back surface of the annular front peripheral portion, and in which the annular front peripheral portion and the annular back peripheral portion are integrally inclined to the surface side. The annular front peripheral portion and the annular back peripheral portion are inclined to the surface side with respect to an imaginary radial plane perpendicular to the center axis of the automotive wheel.

In such a configuration, because the front flange portion has a unitary structure in which the annular front peripheral portion and the annular back peripheral portion are in surface contact with each other, a folded continuous portion between the annular front peripheral portion and the annular back peripheral portion is less likely to be deformed by a load generated while the automobile is running and stress concentration on the folded continuous portion can be mitigated as much as possible. In addition, because the front flange portion in this configuration has a thickness which is substantially equal to the total thickness of the annular front peripheral portion and the annular back peripheral portion, the front flange portion has higher rigidity than the curved front flange portion according to the related art discussed above. This also helps to mitigate stress concentration on the folded continuous portion. As a result, the front flange portion in this configuration can have a sufficient stress allowance before reaching its durability limit, and the automotive wheel improves its durability against the loads acting thereon while the automobile is running.

In addition, because the front flange portion of the automotive wheel according to the present invention is inclined to the surface side, the automotive wheel exhibits excellent durability against a load acting radially thereon via a tire. Specifically, a load acts radially inwardly on the automotive wheel via a tire when the tire contacts a bump or curbstone while the automobile is running. Thus, the radially inward load directly acts on the front flange portion supporting a bead of the tire. The front flange portion of the present invention, which is inclined to the surface side, is easily elastically deformed to the surface side, in the direction in which it is inclined, by the radially inward load to prevent the load from acting on the central portion of the wheel disc. That is, the front flange portion in this configuration is effective in mitigating a radially inward load. In the case of an automotive wheel having a front flange portion extending radially (not inclined to the surface side), when a radially inward load acts thereon, the load cannot be sufficiently mitigated by the front flange portion and tends to be transmitted to the central portion of the wheel disc. In this case, stress concentration occurs at the joint between the axle and the automotive wheel and so on, increasing the possibility of a decrease in durability.

In addition, when the automobile runs onto a relatively large bump or a curbstone, a relatively strong load acts radially inwardly. Even in such a case, the configuration according to the present invention can mitigate the load by the surface-side elastic deformation of the front flange portion. On the other hand, in the case of an automotive wheel having a front flange portion extending radially as discussed above, because the load acts directly and locally on the front flange portion, the front flange portion may undergo local plastic deformation.

As described above, the present invention, in which the front flange portion is inclined to the surface side, is highly effective in mitigating a load which act radially inwardly via a tire and provides improved durability against such a load, and is effective in preventing local plastic deformation of the front flange portion. The improvement of the durability is more effective especially when a radially inward load is repeatedly applied.

In the automotive wheel according to the present invention discussed above, the annular front peripheral portion and the annular back peripheral portion of the front flange portion of the wheel disc may be integrally inclined to the surface side at an inclination angle in the range of 15 degrees to 45 degrees inclusive with respect to a radial direction thereof.

When the inclination angle of the front flange portion is set to an angle smaller than 15 degrees, the front flange portion is less likely to be elastically deformed by a radially inward load and therefore has only a limited effect in the improvement of the durability and prevention of local plastic deformation. On the other hand, when the inclination angle is set to an angle greater than 45 degrees, the front flange portion tends to be deformed beyond its elastic limit by a radially inward load and is therefore less effective in the prevention of plastic deformation and has a limited effect in the improvement of the durability. Therefore, when the inclination angle of the front flange portion is in the range of 15 degrees to 45 degrees inclusive as discussed above, the functional effects of the present invention discussed above, and the improvement of durability and prevention of local plastic deformation, can be further enhanced.

The inclination angle is preferably 25 degrees or greater and 35 degrees or smaller. In this case, the front flange portion can be more effective in the improvement of the durability and prevention of local plastic deformation.

In the automotive wheel according to the present invention discussed above, the wheel rim and the wheel disc are integrated with each other by at least welding an opening end portion of a front bead seat portion of the wheel rim and a back surface portion of the wheel disc circumferentially around the automotive wheel. The back surface portion refers to a region on the back side of the wheel disc and inside the inner end of the annular back peripheral portion of the front flange portion. In addition, the back surface portion is preferably a portion that is located inside the annular back peripheral portion of the wheel disc and defines an outer peripheral edge of the back side.

In such a configuration, because the opening end portion of the front bead seat portion of the wheel rim and the back surface portion of the wheel disc are welded directly to each other, the load acting on the front flange portion from a tire via the wheel rim can be mitigated. This further mitigates the stress concentration on the folded continuous portion of the front flange portion, further improving a functional effect of the present invention, the improvement of the durability of an automotive wheel as a whole. In addition, because the wheel rim is welded directly to the back surface portion, the elastic deformation of the front flange portion by a radially inward load is not inhibited. This enhances the improvement of the durability against a load acting radially inwardly via a tire and the prevention of local plastic deformation.

In this configuration, the front bead seat portion of the wheel rim and the annular back peripheral portion of the front flange portion may be welded to each other, in addition to the opening end portion of the front bead seat portion of the wheel rim and the back surface portion of the wheel disc welded to each other. Alternatively, the annular back peripheral portion of the front flange portion and the back surface portion may be welded to each other, in addition to the opening end portion of the front bead seat portion of the wheel rim and the back surface portion of the wheel disc welded to each other.

In the automotive wheel according to the present invention discussed above, the opening end portion of the front bead seat portion of the wheel rim and the back surface portion of the wheel disc may be welded to each other from outside of the wheel rim.

In the present invention, because the front flange portion is inclined to the surface side, the inner peripheral end surface of the annular back peripheral portion opens outwardly depending on the inclination angle of the front flange portion. Therefore, when the opening end portion of the front bead seat portion of the wheel rim is seated on the back surface portion for welding, a groove-like gap widened outwardly (which will be hereinafter referred to as "open gap") is circumferentially formed between the front bead seat portion and the inner peripheral end surface of the annular back peripheral portion. Because a welding torch can be inserted into the open gap in welding, the opening end portion of the front bead seat portion of the wheel rim and the back surface portion of the wheel disc can be welded to each other easily and stably. In addition, because the welding can be carried out no as to fill the open gap, the welded portion formed by the welding can be prevented from swelling out from the wheel rim. Therefore, interference between a bead of a tire, which is mounted on the automotive wheel, and the welded portion can be suppressed. Thus, the bead of the tire can be securely brought into tight contact with the front bead seat portion and the front flange portion.

Further, in the present invention, the open gap discussed above is formed because the front flange portion is inclined to the surface side. Thus, there is no need for a process to form the open gap. For example, an open gap similar to that of the present invention could be formed by, for example, cutting the inner peripheral end surface of the annular back peripheral portion into a beveled shape, but an additional process of cutting the inner peripheral end surface of the annular back peripheral portion into a beveled shape is required, resulting in an increase in the production process. The present invention has an excellent advantage that an open gap can be formed without such a process of cutting the inner peripheral end surface of the annular back peripheral portion into a beveled shape.

In the automotive wheel according to the present invention discussed above, an annular joint groove, in which the opening end portion of the front bead seat portion of the wheel rim is to be seated, may be formed circumferentially in the back surface portion of the wheel disc, and the annular joint groove and the opening end portion of the front bead seat portion seated in the annular joint groove may be welded to each other.

In this configuration, a part of the welded portion can be formed in the annular joint groove by seating the opening end portion of the front bead seat portion of the wheel rim in the annular joint groove formed in the back surface portion of the wheel disc and welding the opening end portion in the annular joint groove. Therefore, the welded portion can be prevented from swelling outwardly. Because the welded portion is prevented from swelling outwardly when the welded portion is formed from the outside of the wheel rim, the bead of the tire can be securely brought into tight contact with the front bead seat portion of the wheel rim and the front flange portion of the wheel disc as in the case described above.

As discussed above, in the automotive wheel according to the present invention, a front flange portion formed at an outer peripheral edge portion of a wheel disc includes an annular front peripheral portion provided on a design surface side and an annular back peripheral portion folded backward from the annular front peripheral portion to extend radially inwardly and in surface contact with a back surface of the annular front peripheral portion, and the flange portion is inclined to the surface side. Therefore, stress concentration on fielded continuous portion of the front flange portion due to a load acting on the front flange portion via the wheel rim or the wheel disc while the automobile is running can be mitigated. The automotive wheel, therefore, has improved durability against a load generated while the automobile is running as a whole. In addition, the front flange portion, which is inclined to the surface side, can be elastically deformed to mitigate a radially inward load generated by a contact of the tire with a bump or curbstone and acting on the front flange portion, improving, as a whole, the durability of the automotive wheel. Further, even when a relatively strong load is applied radially inwardly, the front flange portion elastically deforms to prevent itself from local plastic deformation. Therefore, the automotive wheel exhibits high durability against a load acting thereon radially inwardly via the front flange portion.

In the automotive wheel according to the present invention discussed above, when the inclination angle at which the front flange portion of the wheel disc is inclined to the surface side is in the range of 15 degrees to 45 degrees inclusive with respect to a radial direction thereof, the improvement of the durability against a radially inward load and prevention of local plastic deformation can be achieved stably, further improving the functional effects of the present invention discussed above.

In the automotive wheel according to the present invention discussed above, when the wheel rim and the wheel disc are integrated with each other by at least welding the opening end portion of the front bead seat portion of the wheel rim and the back surface portion of the wheel disc circumferentially around the automotive wheel, a load acting on the front flange portion via the wheel rim while the automobile is running can be mitigated, further enhancing the functional effect of the present invention of improving the overall durability of the automotive wheel.

In the automotive wheel according to the present invention discussed above, when the opening end portion of the front bead seat portion of the wheel rim and the back surface portion of the wheel disc are welded to each other from outside of the wheel rim, a gap, formed between the front bead seat portion and an inner peripheral end portion of the annular back peripheral portion and opening outwardly enables the welding to be carried out easily and stably. In addition, because the welded portion is prevented from swelling out from the wheel rim, the bead of the tire can be sufficiently brought into tight contact with the front bead seat portion of the wheel rim and the front flange portion of the wheel disc to prevent occurrence of a failure such as leakage of air.

In the automotive wheel according to the present invention discussed above, when an annular joint groove, in which the opening end portion of the front bead seat portion of the wheel rim is to be seated, is formed circumferentially in the back surface portion of the wheel disc, and the annular joint groove and the opening end portion of the front bead seat portion seated in the annular joint groove are welded to each other, a part of the welded portion can be formed in the annular joint groove to prevent the welded portion from swelling outwardly. Therefore, a bead of a tire, which is mounted on the automotive wheel, can be securely brought into tight contact with the front bead seat portion and the front flange portion, preventing occurrence of a failure such as leakage of air.

BRIEF DESCRIPTION OF THE DRAWINGS

FIG. 3 is an explanatory view for comparison between (A) a front flange portion 61 inclined to the surface side as a model for exemplifying the present invention, and (B) a front flange portion 121 of a comparative example which extends radially.

DETAILED DESCRIPTION

An automotive wheel 1 according to an example of the present invention will be described in detail with reference to the accompanying drawings.

Figure 1:
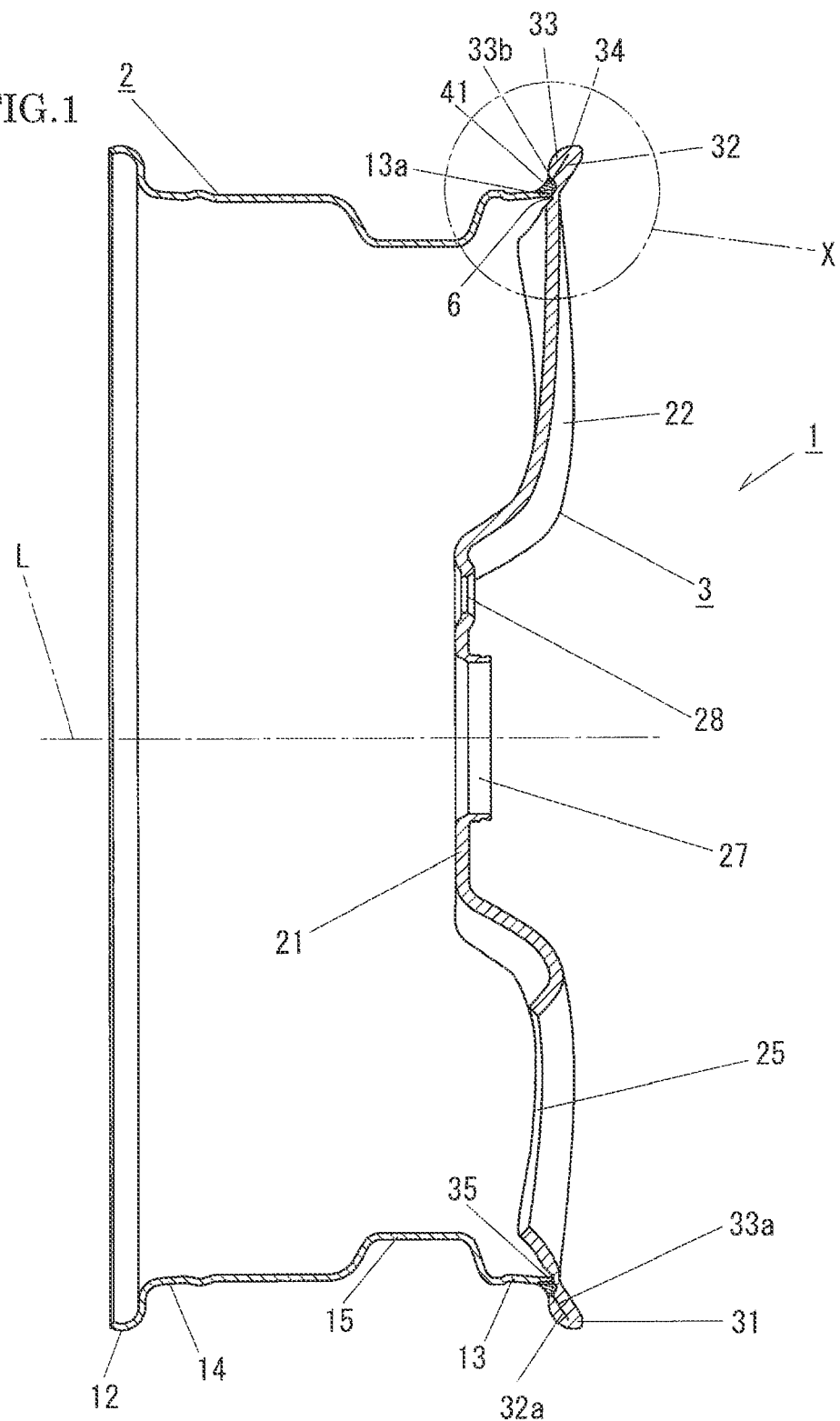
FIG. 1 is a vertical cross-sectional view of an automotive wheel according to an example of the present invention.

FIG. 1 is a vertical cross-sectional view of the automotive wheel 1. The automotive wheel 1 is a so-called two-piece steel wheel formed by joining a wheel rim 2 and a wheel disc 3, each formed from a flat steel plate, to each other. The automotive wheel 1 has a full-face configuration in which a front flange portion 31 is provided at an outer peripheral edge portion of the wheel disc 3. In the example, the direction from the back surface side of the wheel disc 3 toward the design surface side (the direction from left to right in FIG. 1) is defined as a "forward direction", and the opposite direction is defined as a "backward direction". Also, the direction toward the center axis L of the automotive wheel 1 along the radial direction of the wheel is defined to as a "radially inward direction", and the opposite direction is defined to as a "radially outward direction". The design surface of the automotive wheel 1 or the wheel disc 3 refers to a surface which faces outward when the automotive wheel 1 is attached to an automobile.

The wheel rim 2 mentioned above is generally in the shape of a cylinder, and includes a back flange portion 12 provided at one (a back side) opening edge portion to support a back bead of a tire, and a back bead seat portion 14 which is formed continuously with the back flange portion 12 and on which the back bead of the tire is to be seated for support and fixation. The wheel rim 2 further includes a front bead seat portion 13 which is provided at the other (a front) opening edge portion and on which a front bead of the tire is to be seated for support and fixation. That is, no front flange portion 31 is formed at the other (front) opening edge portion of the wheel rim 2, and a front opening edge portion of the wheel rim 2 is formed by the annular front bead seat portion 13 extending along the front-back direction. The wheel rim 2 additionally includes a well portion 15 which is provided between the front and back bead seat portions 13 and 14 and into which the front and back beads of the tire are to be dropped to mount the tire.

The thus configured wheel rim 2 may be formed by abutting the short sides of a generally rectangular flat steel plate against each other and welding the short sides to each other to form a cylindrical member with a straight body, and then performing a so-called rolling process in which the cylindrical member is pressed by predetermined dies from both the inner and outer sides of the cylindrical member while it is rotated in the circumferential direction. The formation of the wheel rim 2 may be performed using a conventional formation method, and therefore is not described in detail herein.

Meanwhile, the wheel disc 3 mentioned above is generally in the shape of a disc, and includes a hub mounting portion 21 provided at the center to be coupled to a hub of an axle, and a front flange portion 31 provided circumferentially at an outer peripheral edge portion. The wheel disc 3 additionally includes a plurality of spoke portions 22 provided between and formed continuously with the hub mounting portion 21 and the front flange portion 31 and arranged at equal intervals in the circumferential direction to extend radially. Further, ornamental holes 25 are respectively formed between adjacent ones of the spoke portions 22.

A hub hole 27 is formed in the center of the hub mounting portion 21. A plurality of bolt holes 28 are formed radially outwardly of the hub hole 27 and arranged at equal intervals in the circumferential direction. The components of the wheel disc 3 are arranged concentrically around the center axis L of the wheel disc 3. The spoke portions 22 are formed to swell forward from the peripheral edge of the hub mounting portion 21. The front flange portion 31 is formed to be smoothly continuous from the outer end of each of the spoke portions 22. The front flange portion 31 constitutes a portion of the present invention, and will be discussed in detail later.

The thus configured wheel disc 3 may be formed by performing a pressing process on a generally circular flat steel plate. The formation of the wheel disc 3 may be performed using a conventional formation method, and therefore is not described in detail herein.

The automotive wheel 1 according to this example is formed by welding the wheel rim 2 and the wheel disc 3 discussed above to each other. The formation of the automotive wheel 1 constitutes a portion of the present invention, and will be discussed later.

Figure 2:
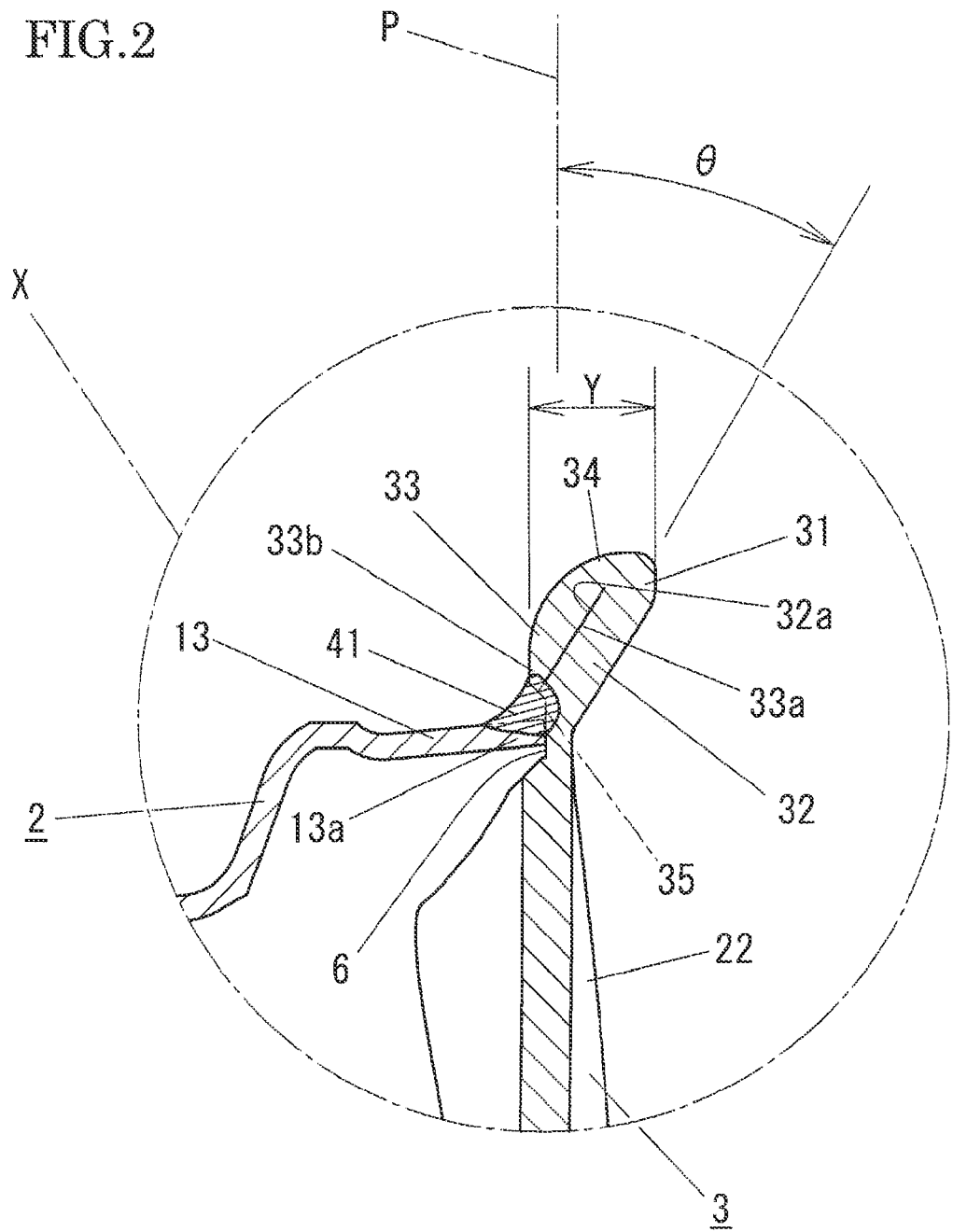
FIG. 2 is an enlarged view of the part X of FIG. 1.
Figure 8:
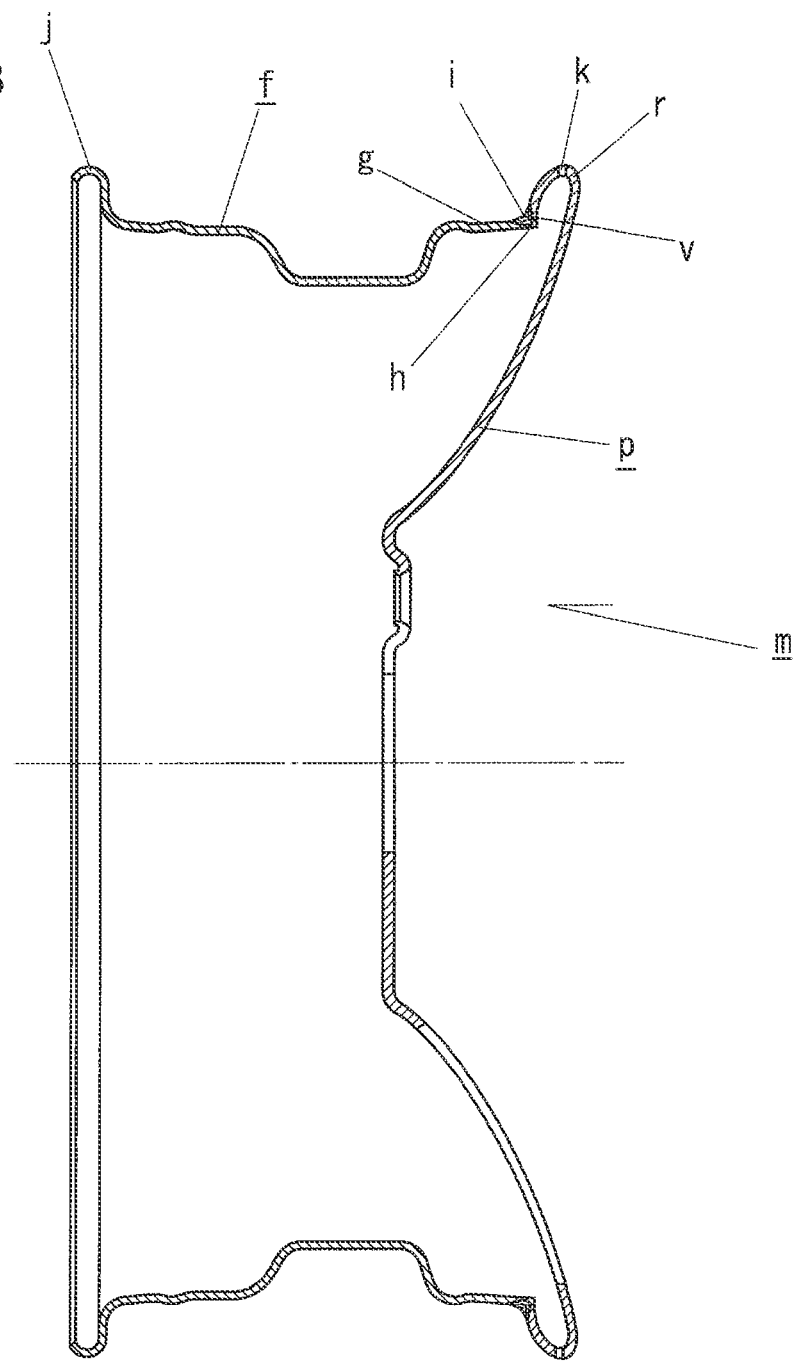
FIG. 8 is a vertical cross-sectional view of an automotive wheel "m" according to the related art.

As shown in FIGS. 1 and 2, the front flange portion 31 provided along an outer peripheral edge of the wheel disc 3 is folded backward to extend radially inwardly. Specifically, the front flange portion 31 includes an annular front peripheral portion 32 provided on the design surface side and formed continuously from an outer end of each of the spoke portions 22, and an annular back peripheral portion 33 folded backward from the annular front peripheral portion 32 to extend radially inwardly. The annular back peripheral portion 33 and the annular front peripheral portion 32 are formed such that a front surface 33a of the annular back peripheral portion 33 is entirely in surface contact with a back surface 32a of the annular front peripheral portion 32. Therefore, the annular front peripheral portion 32 and the annular back peripheral portion 33 have a unitary construction to form the front flange portion 31. The front flange portion 31 has no gap between the annular front peripheral portion 32 and the annular back peripheral portion 33, which is the difference in configuration from the conventional configuration discussed above (see FIG. 8).

In addition, the front flange portion 31 is bent at the base end (inner peripheral end) of the annular front peripheral portion 32 and inclined to the surface side. That is, the front flange portion 31 is inclined at an inclination angle θ with respect to an imaginary radial plane P perpendicular to the center axis L of the automotive wheel 1 (plane extending in the radial direction). The inclination angle θ of the front flange portion 31 is set to an angle in the range of 15 degrees to 45 degrees inclusive. The inclination angle θ is set to limit the width Y of the front flange portion 31 in the front-back direction to 11 mm or greater and 16 mm or smaller. The inclination angle θ and the width Y of the front flange portion 31 in the front-back direction are set appropriately based on the thicknesses of the annular front peripheral portion 32 and the annular back peripheral portion 33. In a specific example, when the thickness of the annular front peripheral portion 32 is 5.3 mm and the thickness of the annular back peripheral portion 33 is 5.3 mm, the inclination angle θ is set to 33 degrees and the width Y in the front-back direction is set to 14 mm.

In the front flange portion 31, the innermost end (inner peripheral end portion 33b) of the annular back peripheral portion 33 is set to have an inside diameter which is greater than the outside diameter of an opening end portion 13a of the front bead seat portion 13 of the wheel rim 2. Accordingly, as discussed later, an inner peripheral end portion 33b of the annular back peripheral portion 33 of the front flange portion 31 is positioned radially outwardly of the opening end portion 13a of the front bead seat portion 13 of the wheel rim 2 with the opening end portion 13a of the front bead seat portion 13 abutting against a back surface portion 6 of the wheel disc 3 (see FIG. 2).

A folded continuous portion 31 between the annular front peripheral portion 32 and the annular back peripheral portion 33 of the front flange portion 31 forms the outermost peripheral edge of the wheel disc 3. In addition, in this example, the inner peripheral end portion 33b of the annular back peripheral portion 33 has been processed into a desired shape.

Further, as shown in FIG. 2, an annular joint groove 35 dented to the surface side is formed circumferentially around the center axis L in the back surface portion 6 of the wheel disc 3. In this example, the back surface portion 6 is defined as a portion that is located inside the annular back peripheral portion 33 of the front flange portion 31 and forms the outer peripheral edge of the back side of the wheel disc 3. That is, the back surface portion 6 is an annular portion between the spoke portions 22 and the annular front peripheral portion 32 of the front flange portion 31. The annular joint groove 35, which is formed circumferentially in the back surface portion 6, is formed adjacently on the inner side of the inner peripheral end portion 33b of the annular back peripheral portion 33 of the front flange portion 31 so that the opening end portion 13a of the front bead seat portion 13 of the wheel rim 2 is to be seated in the annular joint groove 35.

The wheel disc 3 and the wheel rim 2 are joined to each other by positioning the opening end portion 13a of the front bead seat portion 13 of the wheel rim 2 in the annular joint groove 35 formed in the back surface portion 6 of the wheel disc 3 with the respective center axes L of the wheel disc 3 and the wheel rim 2 aligned with each other, and then by welding the wheel disc 3 and the wheel rim 2 to each other. In this case, the back surface portion 6 of the wheel disc 3 and the opening end portion 13*a* of the front bead seat portion 13 of the wheel rim 2 are integrally joined to each other by arc-welding over the entire circumference of the automotive wheel 1 from outside of the wheel rim 2 (see FIG. 2). In this example, the inner peripheral end portion 33*b* of the annular back peripheral portion 33 of the front flange portion 31 of the wheel disc 3 is welded together. As a result of the welding, as shown in FIG. 2, a welded portion 41 in which the wheel rim 2 and the wheel disc 3 are joined to each other is formed over the entire circumference of the automotive wheel 1.

The primary purpose of the above welding is to join the back surface portion 6 of the wheel disc 3 and the wheel rim 2, and the joining of the wheel rim 2 and the annular back peripheral portion 33 of the front flange portion 31 is secondary. Therefore, the welded portion 41 is formed relatively largely on the back surface portion 6 and the wheel rim 2, whereby the wheel disc 3 and the wheel rim 2 are securely joined to each other.

Because the inner peripheral end portion 33*b* of the annular back peripheral portion 33 of the front flange portion 31 is located radially outside the outer surface of the front bead seat portion 13 of the wheel rim 2 and because the annular back peripheral portion 33 is inclined to the surface side, a groove-like gap (open gap) widened outwardly is formed circumferentially between the front bead seat portion 13 of the wheel rim 2 and the annular back peripheral portion 33 (see FIG. 2). In addition, the back surface portion 6 is provided with the annular joint groove 35, and the opening end portion 13*a* of the front bead seat portion 13 of the wheel rim 2 is seated in the annular joint groove 35. Because these arrangements provides a sufficient space to insert a welding torch to carry out the above welding, the front bead seat portion 13 and the back surface portion 6 can be welded to each other easily and stably. Further, these arrangements prevents the welded portion 41 formed by the welding from swelling out from the wheel rim 2. According to the configuration, therefore, interference between a bead of a tire, which is mounted on the automotive wheel 1, and the welded portion 41 can be suppressed. Thus, the bead of the tire can be securely brought into tight contact with the front bead seat portion 13 of the wheel rim 2 and the front flange portion 31 of the wheel disc 3.

The open gap is described below in further detail with reference to FIG. 3(A). It should be noted that FIG. 3(A) shows a model configuration in which the annular joint groove (the annular joint groove 35 in FIG. 2) described above is not formed and an inner peripheral end portion 63*b* of an annular back peripheral portion 63 is not processed (the configuration of another example, which will be discussed later). This model configuration is used for easy understanding of the functional effect of inclining a front flange portion 61, and the configuration of the first embodiment can produce the same functional effect. Because the front flange portion 61 is inclined to the surface side, the inner peripheral end portion 63*b* of the annular back peripheral portion 63 of the front flange portion 61 is also inclined, and an open gap opening outwardly is formed between the inner peripheral end portion 63*b* of the annular back peripheral portion 63 and the front bead seat portion 13 of the wheel rim 2 accordingly. The opening end portion 13*a* of the front bead seat portion 13 and a back surface portion 56 can be welded to each other easily and stably because a welding torch can be inserted into the open gap to carry out the welding. In addition, because a welded portion 59 can be formed in the open gap, the welded portion 59 can be prevented from swelling outwardly. On the other hand, in the case of an automotive wheel 111 of a comparative example in which a front flange portion 121 of a wheel disc 113 extends radially (not inclined to the surface side), an inner peripheral end portion 123*a* of an annular back peripheral portion 123 faces an outer surface of the front bead seat portion 13 of the wheel rim 2 as shown in FIG. 3(B). Therefore, the width of the gap between the inner peripheral end portion 123*a* of the annular back peripheral portion 123 and the front bead seat portion 13 of the wheel rim 2 is narrower than that in the model configuration shown in FIG. 3. In this case, the space for insertion of a welding torch is narrow, making it difficult to weld the front bead seat portion 13 and a back surface portion 116 to each other. In the configuration of the comparative example shown in FIG. 3(B), the annular back peripheral portion 123 of the front flange portion 121 is folded backward from an annular front peripheral portion 122 on the design surface side so that the annular back peripheral portion 123 can be in surface contact with the annular front peripheral portion 122.

Further, in the model configuration shown in FIG. 3(A), the front flange portion 61, because of its inclined shape, easily deforms elastically in the inclined direction when a load is applied radially inwardly to the front flange portion 61 while the automobile is running. Because the radially inward load can be mitigated by the elastic deformation, the stress on the central portion (hub mounting portion) of the wheel disc 53 can be mitigated. Similarly, even when a relatively strong radially inward load is applied locally, the load is mitigated by the elastic deformation. Therefore, the durability against a radially inward load is improved. On the other hand, in the configuration of the comparative example shown in FIG. 3(B), because the front flange portion 121 extends radially, stress on the central portion of the wheel disc 113 resulting from a radially inward load cannot be mitigated, in contrast to the model configuration shown in FIG. 3(A). When the radially inward load is relatively strong, the front flange portion 121 may be plastically deformed locally. Thus, the front flange portion 61 in the model configuration shown in FIG. 3(A) has improved fatigue life compared to the front flange portion 121 in the configuration of the comparative example.

In the automotive wheel 1 according to this example, the front flange portion 31 of the wheel disc 3 has a unitary structure in which the annular front peripheral portion 32 and the annular back peripheral portion 33 are in surface contact with each other and is inclined to the surface side as described above. In addition, the back surface portion 6 of the wheel disc 3 and the wheel rim 2 are welded to each other. These arrangements prevent the load imposed on the wheel disc 3 via the axle and the load imposed on the wheel rim 2 via the tire while the vehicle is running from acting on the folded continuous portion 34 of the front flange portion 31 as much as possible. This can prevent the folded continuous portion 34 of the front flange portion 31 from being repeatedly elastically deformed, and mitigate stress concentration on the front flange portion 31. Therefore, the folded continuous portion 34 of the front flange portion 31 can have a sufficient stress allowance before reaching its fatigue limit even in the case where a residual stress generated in the folded peripheral edge portion 34 of the front flange portion 31 during formation is left in the folded peripheral edge portion 34, improving the durability of the front flange portion 31.

The thus configured automotive wheel 1 according to this example can exhibit high durability compared to the automotive wheel "m" according to the related art discussed above (see FIG. 8). In the automotive wheel "m" according to the related art, the front flange portion "r" is folded into a curved shape, and the front flange portion "r" and the front bead seat portion "g" of the wheel rim "f" are welded to each other.

Thus, the front flange portion "r" tends to be subjected to stress concentration due to loads generated while the automobile is running. In contrast, the configuration of the automotive wheel 1 of this example can mitigate stress concentration on the front flange portion 31, improving the durability of the automotive wheel 1 compared to the automotive wheel "m" according to the related art.

In addition, because the annular front peripheral portion 32 and the annular back peripheral portion 33 are in surface contact with each other with no gap therebetween in which rainwater and so on can not be accumulated when the automotive wheel 1 is attached to an automobile. Therefore, the automotive wheel 1 does not require drain holes in contrast to the conventional automotive wheel described above and has an advantage of being able to avoiding a decrease in strength due to formation of drain holes.

Further, because the front flange portion 31 is inclined to the surface side, it is possible to weld the front bead seat portion 13 of the wheel rim 2 and the back surface portion 6 to each other easily and stably and to prevent the welded portion 41 from swelling outwardly. Moreover, even when a radially inward load that is generated by a contact of the automotive wheel 1 with a curbstone or the like while the automobile is running is applied to the front flange portion 31, the front flange portion 31 elastically deforms forwardly to mitigate the load. This improves the durability of the automotive wheel 1.

Further, the welded portion 41 is formed by three-point welding. Thus, the welded portion 41 can exhibit high strength and rigidity, and stress concentration on the welded portion 41 due to the loads generated while the automobile is running described above is mitigated. Therefore, the durability of the welded, portion 41 can be improved. In particular, the welded portion 41 is formed over the entire circumference of the automotive wheel 1, the durability of the welded portion 41 and the front flange portion 31 can be further improved.

Figure 4:
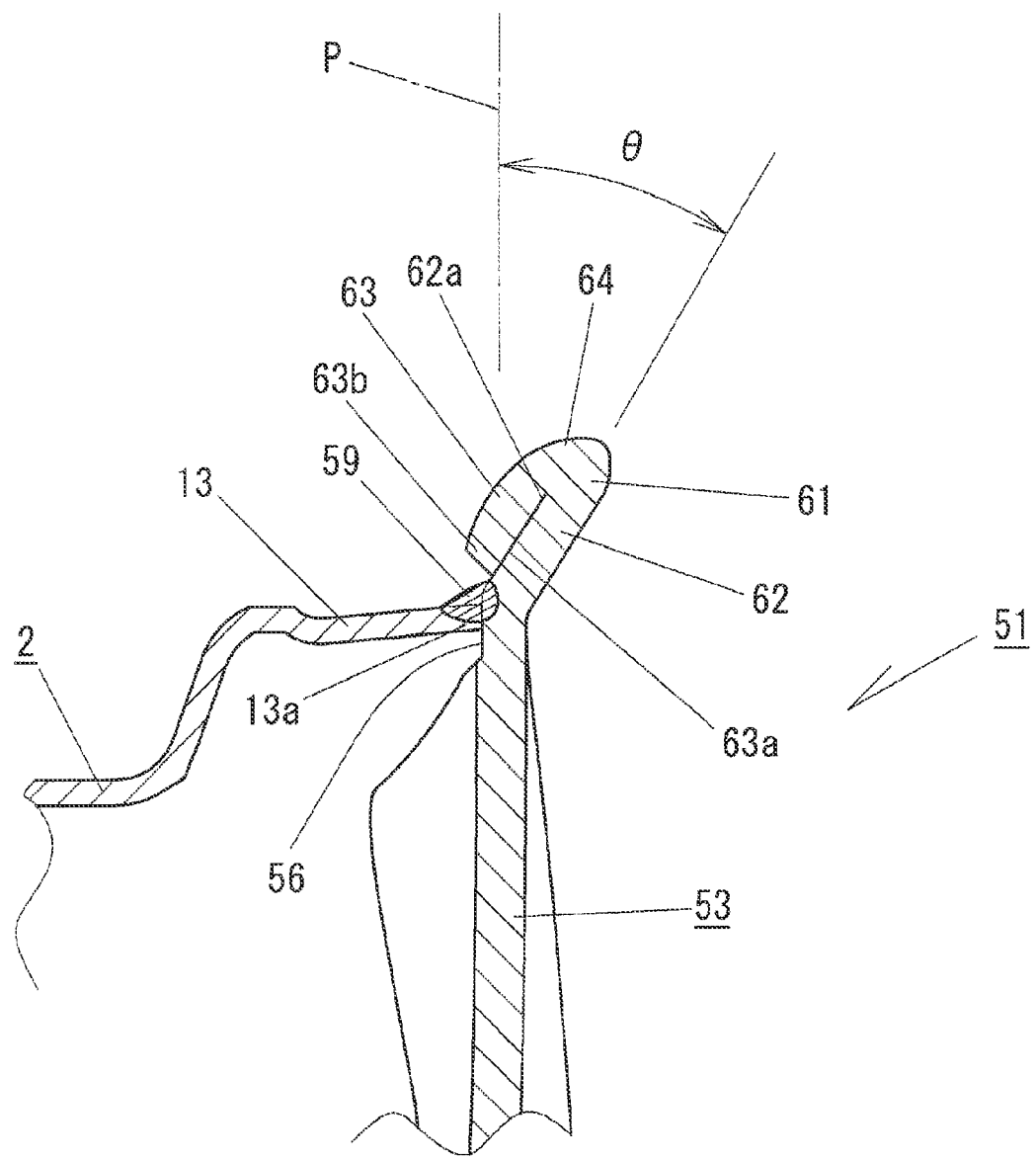
FIG. 4 is an enlarged vertical cross-sectional view illustrating a front flange portion 61 of an automotive wheel 51 according to another example.

In an automotive wheel 51 according to another example, a wheel disc 53 does not have an annular joint groove as described above in a back surface portion 56 and the back surface portion 56 and the wheel rim 2 are welded to each other from outside of the wheel rim 2 as shown in FIG. 4. The front flange portion 61 includes an annular front peripheral portion 62 and an annular back peripheral portion 63 which are integrally inclined to the surface side, and a front surface 63*a* of the annular back peripheral portion 63 is in surface contact with a back surface 62*a* of the annular front peripheral portion 62 just as in the above example. It should be noted that the inner peripheral end portion 63*b* of the annular back peripheral portion 63 of the front flange portion 61 is not processed in contrast to the above example. In addition, the back surface portion 56 has a planar back surface extending generally radially.

This example is the same in configuration as the example discussed above except for this configuration. Thus, like constituent components are denoted by like reference numerals, and therefore are not described herein.

In the configuration according to this example, the opening end portion 13*a* of the front bead seat portion 13 of the wheel rim 2 and the back surface portion 56 are butt-welded to each other. The back surface portion 56 has a generally planar back surface so that the opening end portion 13*a* of the front bead seat portion 13 can stably abut against the back surface portion 56 (see FIG. 3(A)).

The back surface portion 56 and the wheel rim 2 are welded circumferentially to each other by the above welding process, hut the wheel rim 2 and the annular back peripheral portion 63 of the front flange portion 61 of the wheel disc 53 are not welded to each other. Although the annular back peripheral portion 63 of the front flange portion 61 and the wheel rim 2 are not directly welded to each other, the influence of this configuration on the fatigue life of the automotive wheel 51 is very small. Because the annular back peripheral portion 63 of the front flange portion 61 and the wheel rim 2 are not directly welded to each other, the load imposed on the wheel disc 53 via the axle and the load imposed on the wheel rim 2 via the tire while the vehicle is running are prevented from acting on a folded continuous portion 64 of the front flange portion 61 as much as possible.

In addition, the wheel disc 53 according to this example does not have an annular joint groove, whereas the front flange portion 61 is inclined to the surface side as in the example discussed above. Thus, when the opening end portion 13*a* of the wheel rim 2 is brought into abutment against the back surface portion 56, a groove-like open gap is formed among the inner peripheral end portion 63*b* of the annular back peripheral portion 63 of the front flange portion 61, the front bead seat portion 13, and the annular back peripheral portion 63 as shown in FIG. 3(A). The open gap enables the back surface portion 56 and the wheel rim 2 to be welded to each other easily and stably. In addition, the welded portion 59 formed by the welding process is prevented from swelling outwardly. Therefore, interference between a bead of a tire, which is mounted on the automotive wheel 51, and the welded portion 59 can be suppressed. Thus, the bead of the tire can be securely brought into tight contact with the front bead seat portion 13 of the wheel rim 2 and the front flange portion 61 of the wheel disc 53.

Moreover, because the front flange portion 61 is inclined to the surface side, when a radially inward load that is generated by a contact of the automotive wheel 1 with a curbstone or the like while the automobile is running is applied to the front flange portion 61, the shape of the front flange portion 61 allows the front flange portion 61 to deform elastically to mitigate the load. Therefore, the front flange portion 61 can exhibit high durability against such a radially inward load. Similarly, even when a relatively strong load is applied radially inwardly to the front flange portion 61, the front flange portion 61 elastically deforms to prevent local plastic deformation.

Figure 5:
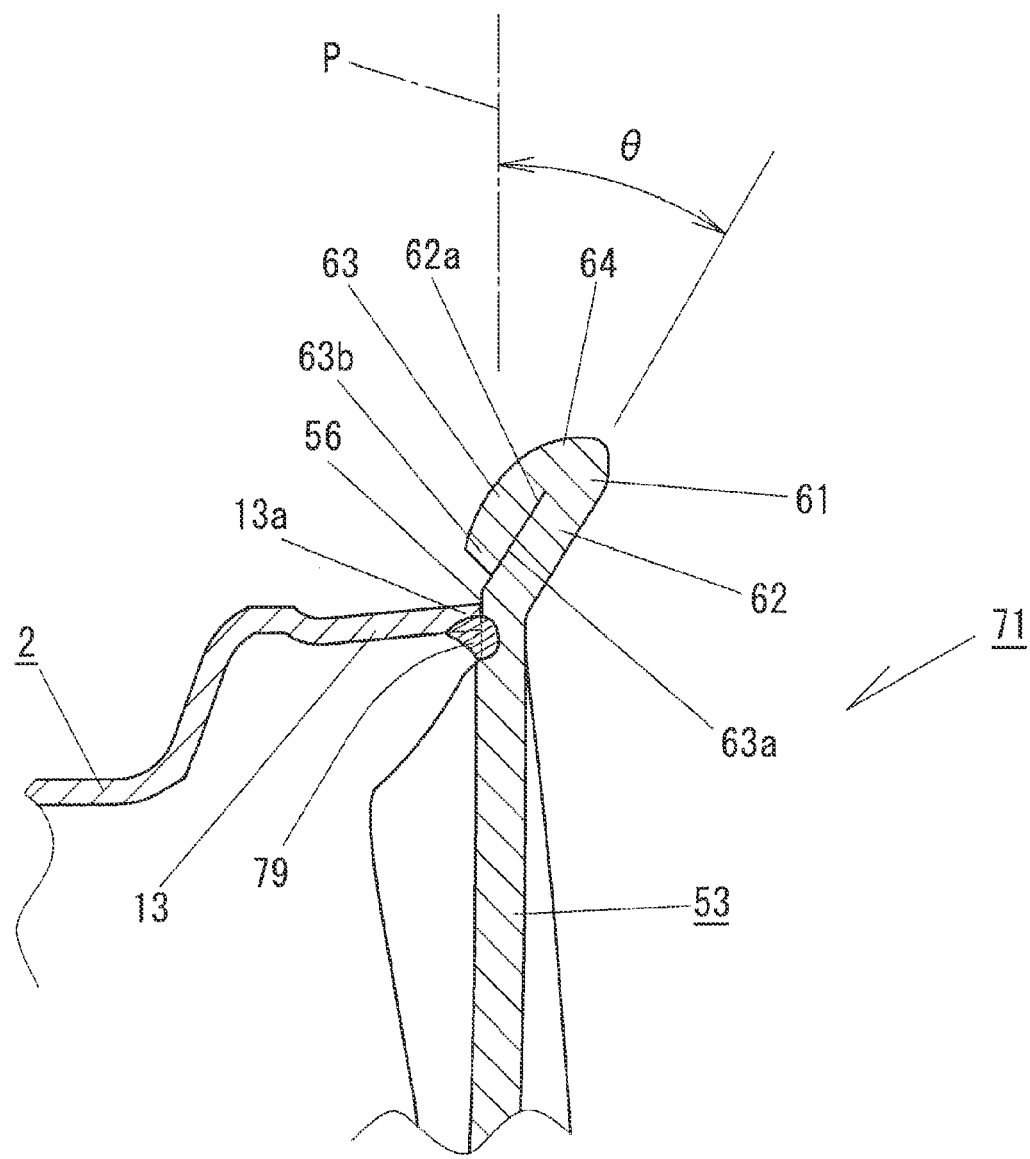
FIG. 5 is an enlarged vertical cross-sectional view illustrating a front flange portion 61 of an automotive wheel 71 according to a further example.

In an automotive wheel 71 according a further example, the back surface portion 56 of the wheel disc 53 and the wheel rim 2 in the example discussed above are welded to each other from inside of the wheel rim 2 as shown in FIG. 5. Therefore, a welded portion 79 is formed inside the wheel rim 2. This example is the same in configuration as the example discussed above except for this configuration. Thus, like constituent components are denoted by like reference numerals, and therefore are not described herein.

In the configuration according to this example, the front flange portion 61 is also inclined surface side and effective in mitigating a radially inward load to improve the durability and prevent local plastic deformation just as in the example discussed above.

Figure 6:
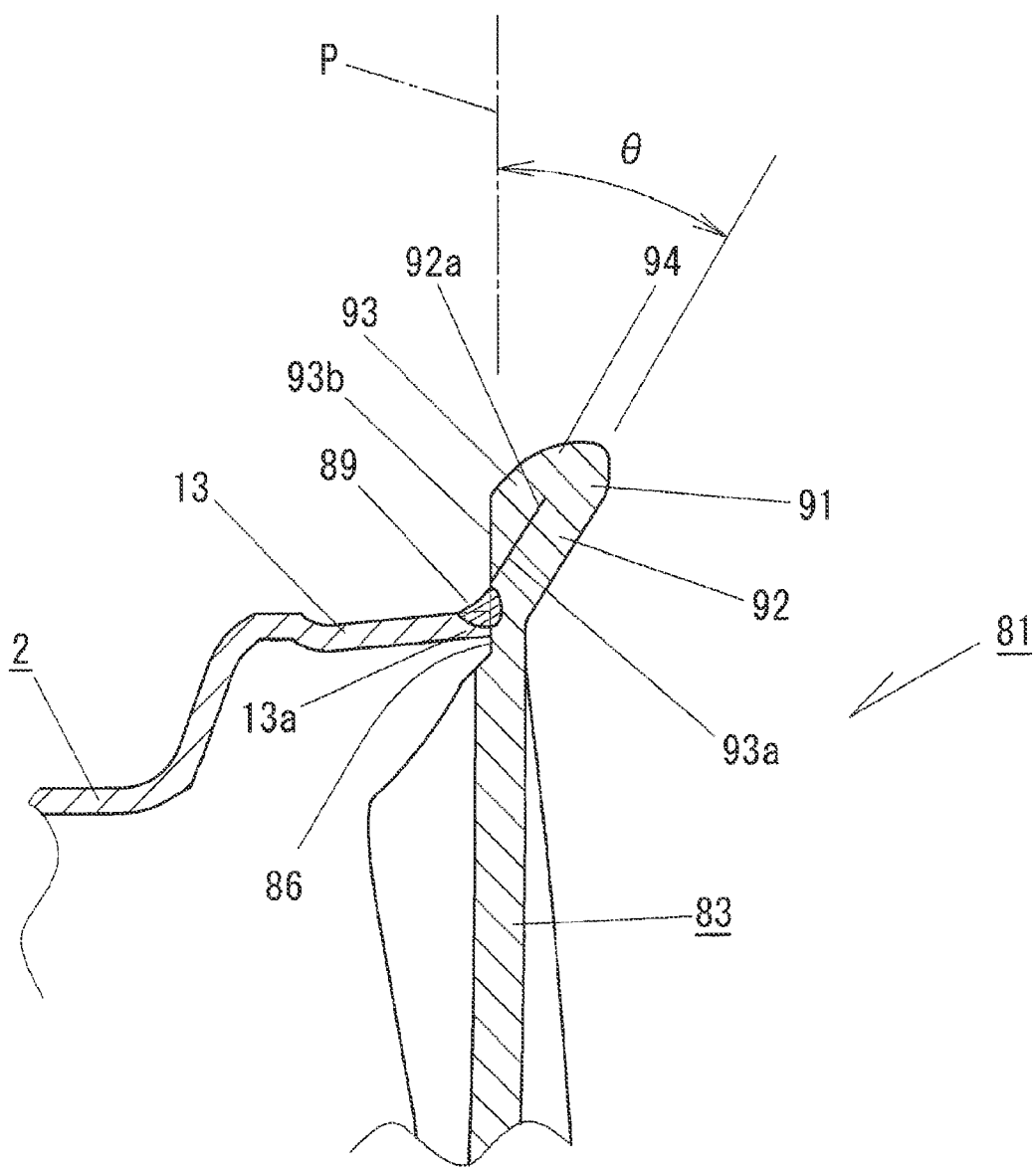
FIG. 6 is an enlarged vertical cross-sectional view illustrating a front flange portion 91 of an automotive wheel 81 according to an additional example.

In an automotive wheel 81 according a yet another example, an annular back peripheral portion 93 which forms a front flange portion 91 of a wheel disc 83 has an inner peripheral end surface 93*b* that is generally flush with a back surface portion 86 as shown in FIG. 6. The inner peripheral end surface 93*b* of the annular back peripheral portion 93 and the back surface of the back surface portion 86 both has a planar shape extending generally radially. The back surface portion 86 of the wheel disc 83 and the front bead seat portion 13 of the wheel rim 2 are welded to each other from outside.

It should be noted that the annular joint groove is not provided in this example as in the example discussed above.

In the front flange portion 91 of this example, an annular front peripheral portion 92 and the annular back peripheral portion 93 are integrally inclined to the surface side with a back surface 92a of the annular front peripheral portion 92 and a front surface 93a of the annular back peripheral portion 93 in surface contact with each other. That is, the front flange portion 91 is the same in configuration as the front flange portion in the example above except the inner peripheral end surface 93b of the annular back peripheral portion 93 is formed flush with the back surface portion 86. Thus, like constituent components are denoted by like reference numerals, and therefore are not described herein.

The configuration of the present example can, just as the configuration of the example discussed above, prevent the load imposed on the wheel disc 83 via the axle and the load imposed on the wheel rim 2 via the tire while the vehicle is running from acting on a folded continuous portion 94 of the front flange portion 91 as much as possible. Further, because the front flange portion 91 is inclined to the surface side, it is possible to weld the front bead seat portion 13 of the wheel rim 2 and the back surface portion 86 to each other easily and stably and to prevent the welded portion 89 from swelling outwardly. In addition, a radially inward load can be mitigated and local plastic deformation of the front flange portion 91 can be prevented.

Figure 7:
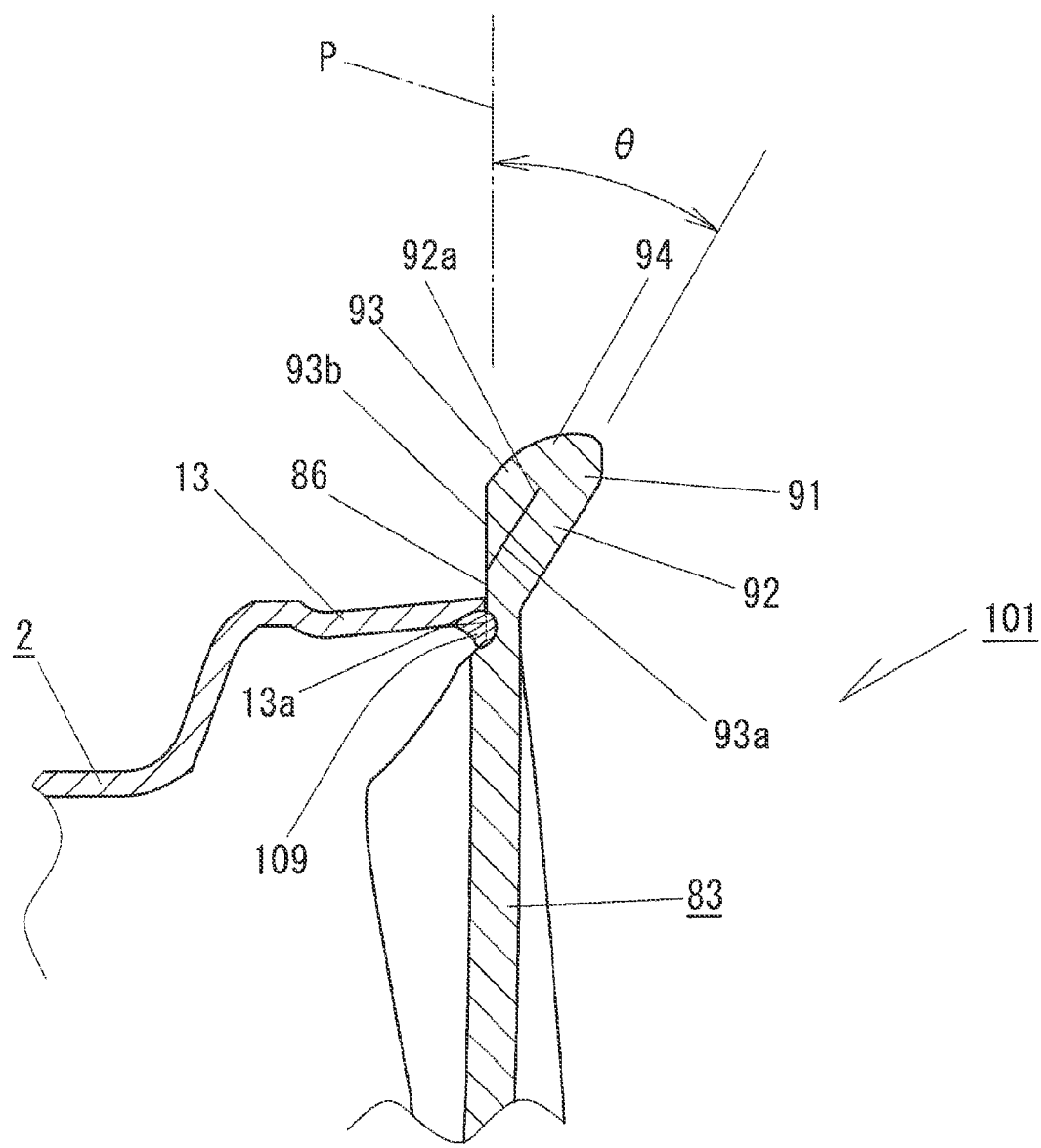
FIG. 7 is an enlarged vertical cross-sectional view illustrating a front flange portion 91 of an automotive wheel 101 according to an example.

An automotive wheel 101 according to an additional example includes a wheel disc 83 and a the wheel rim 2 which are similar to those of the example discussed above but welded to each other from inside of the wheel rim 2 as shown in FIG. 7. Therefore, a welded portion 109 is formed inside the wheel rim 2. This example is the same in configuration as the above example except that the wheel disc 83 and the wheel rim 2 are welded to each other from inside of the wheel rim 2, and therefore is not described in detail herein.

In the configuration according to this example, the front flange portion 91 is also inclined to the surface side and effective in mitigating a radially inward load to improve the durability and prevent local plastic deformation just as in the example discussed above.

The back surface portion in the configuration according to the other examples discussed above may not have an annular joint groove as in the other configurations. The back surface portion in the configurations according to certain example may have an annular joint groove as in the other examples.

In the configuration according to the examples discussed above, the welding may be carried out from inside of the wheel rim. In this case, the front bead seat portion of the wheel rim and the back surface portion are welded to each other. In the configurations according to the other example, the front bead seat portion of the wheel rim, the back surface portion and the annular back peripheral portion of the front flange portion may be welded together.

The present invention is not limited to the example discussed above, and may be modified appropriately within the scope and spirit of the present invention. For example, the present invention may be applied to automotive wheels with the same configuration that are formed from an aluminum alloy, a magnesium alloy, a titanium alloy, or a fiber-reinforced metal (FRM), achieving the same effect.

What is claimed is:

1. An automotive wheel comprising:
   a wheel rim comprising:
      a back flange portion formed at an opening edge portion;
      a front bead seat portion formed at another opening edge portion; and
      a wheel disc, having a front flange portion at an outer peripheral edge portion,
   wherein the front flange portion of the wheel disc includes:
      an annular front peripheral portion provided on a design surface side; and
      an annular back peripheral portion folded backward from the annular front peripheral portion to extend radially inwardly and in surface contact with a back surface of the annular front peripheral portion, and
   wherein the annular front peripheral portion and the annular back peripheral portion are integrally inclined to the surface side.

2. The automotive wheel according to claim 1, wherein the annular front peripheral portion and the annular back peripheral portion of the front flange portion of the wheel disc are integrally inclined to the surface side at an inclination angle in the range of 15 degrees to 45 degrees inclusive with respect to a radial direction thereof.

3. The automotive wheel according to claim 1, wherein the wheel rim and the wheel disc are integrated with each other by at least welding an opening end portion of a front bead seat portion of the wheel rim and a back surface portion of the wheel disc circumferentially around the automotive wheel.

4. The automotive wheel according to claim 3, wherein the opening end portion of the front bead seat portion of the wheel rim and the back surface portion of the wheel disc are welded to each other from outside of the wheel rim.

5. The automotive wheel according to claim 3, further comprising an annular joint groove, in which the opening end portion of the front bead seat portion of the wheel rim is seated, is formed circumferentially in the back surface portion of the wheel disc, and
   Wherein the annular joint groove and the opening end portion of the front bead seat portion seated in the annular joint groove are welded to each other.

* * * * *